July 14, 1964     O. RENNINGER     3,140,670
AERIAL CABLEWAYS
Filed May 4, 1962
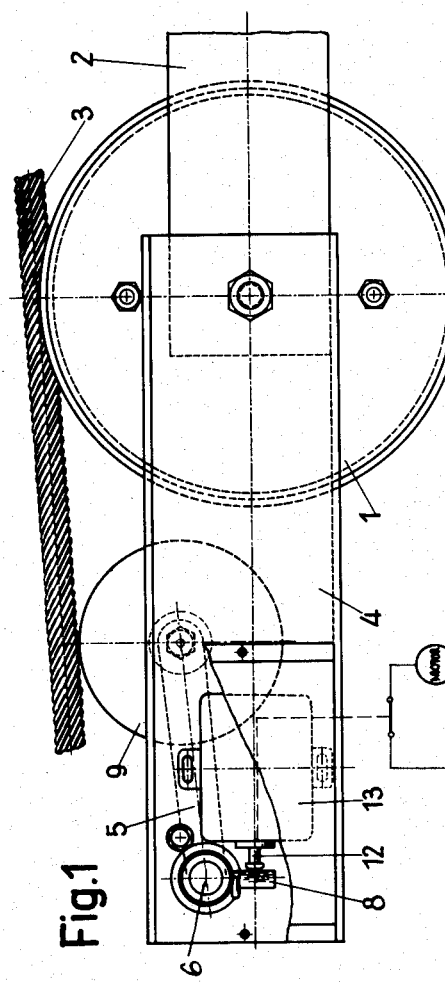
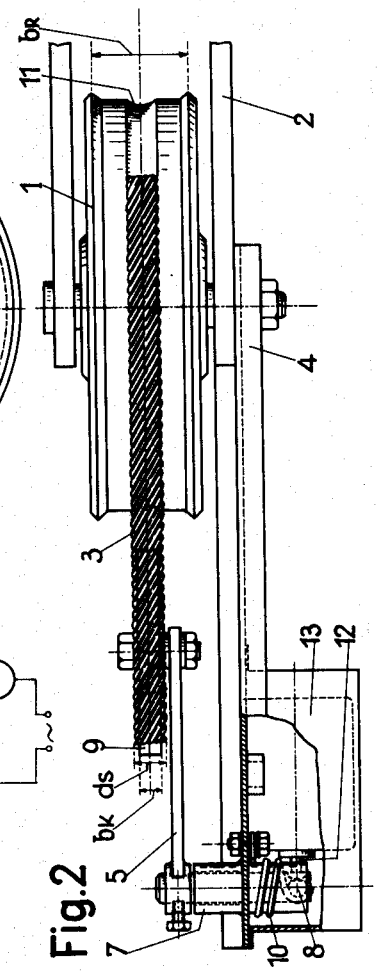
Otto Renninger
INVENTOR.
BY Wenderoth, Lind
and Ponack,
attorneys United States Patent Office 3,140,670
Patented July 14, 1964

3,140,670
AERIAL CABLEWAYS
Otto Renninger, Wolfurt, Vorarlberg, Austria, assignor to Konrad Doppelmayr & Sohn, Maschinenfabrik, Wolfurt, Vorarlberg, Austria
Filed May 4, 1962, Ser. No. 192,399
Claims priority, application Austria May 5, 1961
6 Claims. (Cl. 104—178)

This invention relates to a cable control mechanism for ropeways and the like, particularly aerial cableways.

A sliding or slipping of the cable from the guide rollers is one of the greatest dangers in the operation of aerial cableways. It is an object of the invention to provide means for preventing a sliding from or a releasing of the cable from a guide roller and a stopping of the means driving the cable by a control mechanism.

Various devices have been used for controlling lateral shifting of the cable upon the guide rollers and it is a further object of the invention to provide a control mechanism which eliminates the disadvantages inherent in the cable controls at present in use.

A further object of the invention is to provide a control mechanism which is operated before there is a complete release of the cable from the guide roller.

A further object of the invention is to provide a feeler in contact with the cable which is preferably designed as a rotating disc which is less in width than the width of the cable guide rollers. Therefore, as soon as the cable or rope deviates from its proper position beyond a certain predetermined extent, contact between the cable and the feeler is discontinued and an electrical switch is operated by such feeler so that the driving power for the cable is discontinued.

A further object of the invention is to provide a control mechanism wherein the feeler can be operated from various angles with respect to the cable.

A further object of the invention is to provide with certainty a stopping of the cable driving means before the cable is released from the guide roller and this is obtained by making the width of the feeler cable contacting portion smaller than or equal to the guide roller width less the cable diameter or still better if the width of the feeler contacting portion is smaller than or equal to the roller width less the double cable diameter.

A still further object of the invention is to assure contact between the feeler and the cable by spring means.

With the above and other objects in view which will become apparent from the detailed description below, one preferred embodiment of the invention is shown in the drawings in which:

FIGURE 1 is a side elevational view showing one guide roller and a portion of the cable and, FIGURE 2 is a plan view of the control mechanism shown in FIGURE 1.

The control mechanism illustrated is particularly designed to be used in connection with towrope equipment such as a ski lift.

In the figures a guide roller 1 is shown pivoted on the tilting member 2 of a roller battery. The hoisting cable 3 runs over the roller 1.

A support 4 is connected to the member 2 and the control mechanism according to the present invention is arranged on such support.

As shown, the feeler comprises a feeler arm 5 clamped on a bolt 6 which is rotatably mounted in the support 4. The bolt 6 passes through a bearing box 7 welded on the support 4 and connected to the other end of the bolt 6 from the arm 5 is a switch arm 8. A spring 10 urges the feeler head 9 which is in the form of a disc upwardly against the rope or cable 3. One end of the helical spring 10 is connected with the support 4 as shown and the other end acts upon switch arm 8.

The width $bK$ of the disk forming the feeler head is smaller than the width of the roller $bR$ and also smaller than the cable diameter $dS$; moreover, it holds that the width $bK$ of the feeler head is smaller than the roller width $bR$ less the double diameter of the cable $$2dS(bK<bR-2dS)$$

With the above construction, when the hoisting cable 3 deviates laterally from the position determined by the groove 11 in the roller 1 the feeler arm 5 together with the feeler head 9 is pivoted upwardly by the action of the helical spring 10. When this occurs the switch arm 8 contacts the contact 12 of the switch 13 thereby interrupting the electrical circuit driving the motor which drives the cable 3.

It will be noted that the stopping of the motor will consequently take place before the cable 3 is released from the guide roller 1. This is due to the fact that the width of the disc 9 is much smaller than the width of the roller 1. Therefore an actual release of the cable from the guide roller does not take place and the cable 3 is stopped before it slides off or is released from the roller 1.

From the construction described, the cable is stopped as soon as the cable 3 is lifted by more than a certain extent from the roller 1 and therefore hardly any lateral deviation of the cable from its normal position on the roller takes place before the cable is stopped. There is therefore provided a certain effective protection against any sliding or slipping of the cable from the guide roller.

It is also obvious that various modifications may be made in the above construction to accomplish the results desired.

In the modification described the stopping of the cable takes place upon an upward movement of the feeler 9 but this stopping of the cable may also be accomplished by means responsive to a downward movement of the cable 3.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A cable control mechanism for ropeways and the like having a cable running over a cable guide roller and an electrical motor with an electrical circuit for driving said cable comprising a feeler contacting said cable when said cable moves normally in proper position over said cable guide roller, a support on which said feeler is mounted, an electrical switch in said circuit mounted on said support adjacent said cable guide roller, a member on said feeler to operate said electrical switch to stop said motor when said cable moves laterally on said cable guide roller beyond a predetermined distance, said feeler having a cable contacting portion smaller in width than said cable guide roller so that the stopping of said motor occurs before said cable is released from said guide roller.

2. A cable control mechanism as described in claim 1, wherein the width of said cable contacting portion is less than the diameter of said cable, so that the stopping of said motor occurs if the cable undergoes a lateral displacement of less value than the cable diameter.

3. A cable control mechanism as described in claim 1 wherein the width of said cable contacting portion is smaller than the roller width less the cable diameter, so that the stopping of said motor occurs although the laterally displaced cable still lies with one half of its diameter within the lateral borders of the guide roller.

4. A cable control mechanism as described in claim 1, wherein the width of said cable contacting portion is smaller than said roller width less the double cable diameter, so that the stopping of said motor occurs although the laterally displaced cable still lies with its entire diameter within the lateral borders of said guide roller.

5. A cable control mechanism as described in claim 1 wherein spring means urge said feeler against said cable.

6. A cable control mechanism as set forth in claim 1 wherein said feeler is a rotary disc having an axis parallel to the axis of said guide roller.

References Cited in the file of this patent

UNITED STATES PATENTS 3,071,083    Hochmuth _____ Jan. 1, 1963

FOREIGN PATENTS 819,101    Germany _____ Oct. 29, 1951
1,199,721    France _____ June 22, 1959